Nov. 17, 1953
R. A. FRANZ
2,659,748
PROCESS OF PREPARING ACRYLONITRILE
Filed June 30, 1951
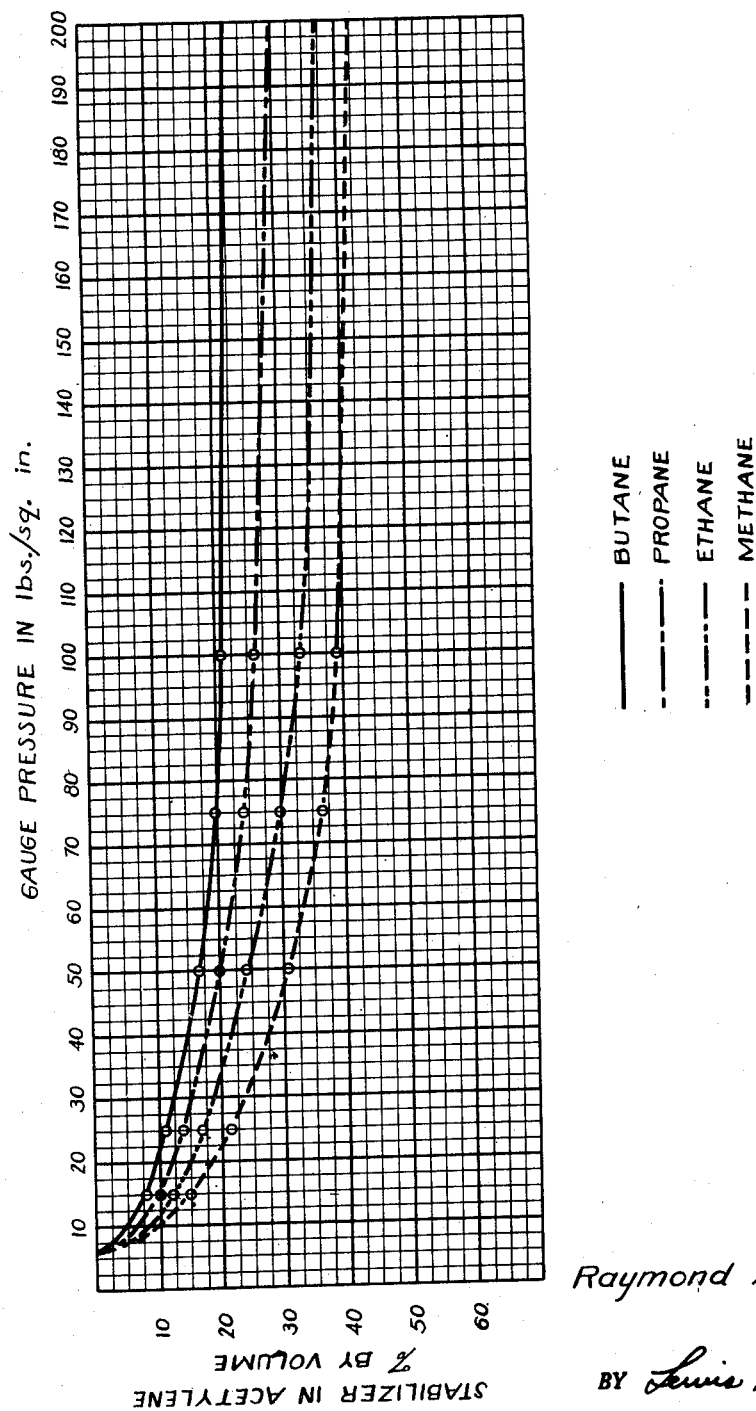
Raymond A. Franz
INVENTOR.
BY Lewis H. Wilson
ATTORNEY Patented Nov. 17, 1953

2,659,748

UNITED STATES PATENT OFFICE 2,659,748

PROCESS OF PREPARING ACRYLONITRILE

Raymond A. Franz, El Dorado, Ark., assignor to Lion Oil Company, El Dorado, Ark., a corporation of Delaware Application June 30, 1951, Serial No. 234,570

13 Claims. (Cl. 260—465.3)

This invention relates to the production of acrylonitrile and more particularly to an improved process of preparing acrylonitrile from acetylene and hydrogen cyanide in the presence of an aqueous cuprous chloride complex as a catalyst and a saturated hydrocarbon as a stabilizer.

It is known that acrylonitrile can be prepared by reacting together acetylene and hydrogen cyanide in the presence of acidic aqueous cuprous chloride catalyst. Ammonium chloride, alkali metal chlorides such as potassium chloride, and an amine hydrochloride such as ethanolamine hydrochloride have been used as aids in bringing the cuprous chloride catalyst into solution. Strong mineral acids such as hydrochloric, sulfuric, phosphoric and hydrobromic acids have been used to adjust the catalyst to the desired acidity. Usually a small amount of metallic copper is used to reduce the cupric salts ordinarily present in cuprous chloride and to maintain the soluble copper in the cuprous condition. Since the catalyst oxidizes easily, care is taken that the hydrogen cyanide and acetylene are essentially oxygen free. The foregoing conventional process is carried out at a temperature of about 80° C.– 90° C.

While the above described process represents a substantial contribution to the art, it is not entirely satisfactory. One drawback of primary concern is that the yield of acrylonitrile is undesirably low. A further disadvantage is that the process is hazardous. The hazard involved in working with acetylene is well known.

An object of this invention is to provide an improved process of preparing acrylonitrile from acetylene, hydrogen cyanide, and a cuprous chloride complex catalyst. A further object is to provide such a process characterized by a high yield of acrylonitrile. A still further object is to provide a process of preparing acrylonitrile by reacting together acetylene and hydrogen cyanide in the presence of a saturated hydrocarbon as stabilizer and in contact with an aqueous solution of a cuprous chloride complex as catalyst, whereby a high yield of acrylonitrile is obtained and at the same time the explosion hazard involved in carrying out the process is minimized.

Unless otherwise specified, pressure as used herein is pounds per square inch gauge.

The above objects are accomplished according to this invention by reacting together at superatmospheric pressure acetylene and hydrogen cyanide in contact with a cuprous chloride complex as catalyst and in the presence of an alkane having 1–4 carbon atoms as stabilizer.

In practicing the present invention according to a preferred embodiment thereof the cuprous chloride complex is charged into a vertically disposed reaction vessel. The catalyst is subjected to super-atmospheric pressure and brought to a temperature of about 80° C.–125° C. A gaseous mixture of acetylene and an alkane having 1–4 carbon atoms is introduced into the catalyst through one line and hydrogen cyanide is introduced into the catalyst through another line such that an excess of acetylene to hydrogen cyanide is employed, both lines entering the vessel near the base thereof. The unreacted acetylene and the acrylonitrile formed, in addition to certain impurities, pass out the top of the reaction vessel primarily in the form of gases and the acrylonitrile is recovered therefrom by scrubbing with water. Of course, alternatively, the acrylonitrile can be recovered by chilling the exit gases.

The acrylonitrile from the resulting aqueous 1%–2% solution is recovered by distillation and the unreacted acetylene is recycled through the reaction vessel along with the desired amount of make-up acetylene.

It is known in this art that the rate at which hydrogen cyanide is passed through the catalyst and the acetylene/hydrogen cyanide ratio employed are important factors affecting the performance of the catalyst, the formation of by-products, and therefore the yield of acrylonitrile. Preferably the hydrogen cyanide velocity is 0.02–0.03 part of hydrogen cyanide per part of cuprous chloride per hour. Preferably the molar ratio of acetylene to hydrogen cyanide used is about 5/1 to 7/1.

In addition to the foregoing, the yield of acrylonitrile is dependent on the pressure employed in carrying out the reaction. Theoretically, based on pressure alone, the yield should vary directly as the pressure, e. g. the yield at 10 pounds pressure should be double the yield at 5 pounds pressure. The solubility of acetylene in the catalyst solution likewise varies directly as the pressure used. However, the explosibility limit of acetylene has been the limiting factor, this limit being about 6 pounds pressure.

According to the present invention it has been found that by stabilizing the acetylene with an alkane having 1–4 carbon atoms (namely, methane, ethane, propane, butane) pressures far in excess of 6 pounds can be used very safely and a marked improvement in yield of acrylonitrile thereby obtained. Although the dilution of the acetylene resulting from use of the stabilizer has an adverse effect on yield of acrylonitrile, the increase in yield made possible by enabling the use of higher pressures far outweighs the former.

The following table, which is illustrated graphically in the accompanying drawing, shows the minimum amounts of the various stabilizers required to prevent explosion of acetylene at different pressures. As an added safety measure desirably the amount of stabilizer employed in practicing this invention will be about 10% greater than that shown in the table and drawing. Of course, still greater quantities of stabilizer can be used. As will be noted, the efficiency of the stabilizer varies directly as the length of the chain of the stabilizer, butane being the most effective stabilizer. In the drawing the curves have been projected to show the approximate amount of stabilizer required to prevent the explosion of acetylene when using pressures from 100-200 pounds.

TABLE 1

*Amount of stabilizer required to prevent explosion of acetylene at pressures shown*

| Pressure lbs./sq. in. gauge | Stabilizer in Acetylene, Percent by Volume | | | |
|---|---|---|---|---|
| | Butane | Propane | Ethane | Methane |
| 5.9 (blank) | | | | |
| 15 | 8 | 10 | 12 | 15 |
| 25 | 11 | 13 | 17 | 20 |
| 50 | 17 | 20 | 24 | 30 |
| 75 | 19 | 24 | 30 | 35 |
| 100 | 21 | 26 | 32 | 38 |

Thus by employing a mixture of 21% butane and 79% acetylene (preferably about 23% butane and 77% acetylene) a pressure of 100 pounds may be used safely, whereas in the absence of a stabilizer it is dangerous to employ pressures above approximately 6 pounds.

The following examples, wherein parts are by weight, illustrate specific embodiments of this invention but the invention is not limited thereto.

EXAMPLE 1

*Atmospheric pressure*

The catalyst was prepared by mixing (in an atmosphere of nitrogen) 1248 parts of cuprous chloride, 653 parts of ammonium chloride, 54 parts of copper powder, 81 parts of concentrated hydrochloric acid and 1334 parts of water. The resulting catalyst solution was transferred to the vertically disposed cylindrical reaction vessel filled with Raschig rings. A mixture of 175 parts acetylene, 96 parts of butane and 25 parts of hydrogen cyanide was bubbled up through the reaction vessel per hour. The catalyst was maintained at a temperature of about 90° C. The gases issuing from the reaction mixture were scrubbed with water so as to form a 1.5%-2% aqueous solution of acrylonitrile which in turn was recovered in a stripping tower. The unreacted acetylene together with the butane was recycled along with fresh amounts of acetylene. The yield of crude acrylonitrile of about 90% purity was 39 parts per hour.

EXAMPLE 2

*Four atmospheres pressure*

The procedure and reaction conditions were the same as those set forth in Example 1 above, except that a pressure of 4 atmospheres was employed and the temperature of the catalyst solution was about 125° C. The yield of crude acrylonitrile of 90% purity was 130 parts.

It will be seen from the foregoing that the present invention represents a very important contribution of commercial significance to the art.

As many apparently widely different embodiments of this invention may be made without departing from the spirit and scope thereof, it it to be understood that the invention is not limited to the specific embodiments thereof except as defined in the appended claims.

What is claimed is:

1. Process of preparing acrylonitrile which comprises reacting together at super-atmospheric pressure acetylene and hydrogen cyanide in the presence of an aqueous solution of a cuprous chloride complex and an alkane having 1-4 carbon atoms.

2. Process of claim 1, in which the alkane is butane.

3. Process of claim 1, in which the alkane is propane.

4. Process of claim 1, in which the alkane is ethane.

5. Process of claim 1, in which the alkane is methane.

6. Process of preparing acrylonitrile which comprises reacting together at super-atmospheric pressure acetylene and hydrogen cyanide in the presence of an aqueous solution of cuprous chloride and an alkane having 1-4 carbon atoms and employing a hydrogen cyanide velocity of 0.02-0.03 part by weight per part by weight of cuprous chloride per hour and an acetylene/hydrogen cyanide ratio of 5/1 to 7/1.

7. Process of preparing acrylonitrile which comprises reacting together acetylene and hydrogen cyanide in the presence of an aqueous solution of cuprous chloride and an alkane having 1-4 carbon atoms, said reaction being carried out at a pressure above atmospheric but below the explosibility limit of acetylene under the reaction conditions employed.

8. Process of claim 7, in which the alkane is butane.

9. Process of claim 7, in which the alkane is propane.

10. Process of claim 7, in which the alkane is ethane.

11. Process of claim 7, in which the alkane is methane.

12. Process of preparing acrylonitrile which comprises reacting together acetylene and hydrogen cyanide in the presence of an aqueous solution of cuprous chloride and an alkane having 1-4 carbon atoms and employing a hydrogen cyanide velocity of 0.02-0.03 part by weight per part by weight of cuprous chloride per hour and an acetylene/hydrogen cyanide ratio of 5/1 to 7/1, said reaction being carried out at a pressure above atmospheric but below the explosibility limit of acetylene under the reaction conditions employed.

13. Process of preparing acrylonitrile which comprises reacting together acetylene and hydrogen cyanide in the presence of an aqueous solution of a cuprous chloride complex at a pressure of about 2-7 atmospheres, the acetylene being first stabilized against explosion under said pressures by mixing therewith by volume at least about 8%-21% of butane.

RAYMOND A. FRANZ.

References Cited in the file of this patent

UNITED STATES PATENTS

| Number | Name | Date |
|---|---|---|
| 2,370,849 | Dutcher | Mar. 6, 1945 |
| 2,413,496 | Green et al. | Dec. 31, 1946 |
| 2,433,182 | Wolk | Dec. 23, 1947 |

OTHER REFERENCES

Nill et al., Fiat Final Report No. 1125, pp. 1-11 (1947).

Matthews, P. B. 47715, British Intelligence Objectives Sub. Committee, p. 1 (1946).